US007308474B2

(12) United States Patent
Chandrasekar et al.

(10) Patent No.: US 7,308,474 B2
(45) Date of Patent: Dec. 11, 2007

(54) TECHNIQUES FOR SCALABLY ACCESSING DATA IN AN ARBITRARILY LARGE DOCUMENT BY A DEVICE WITH LIMITED RESOURCES

(75) Inventors: Sivasankaran Chandrasekar, Palo Alto, CA (US); Ravi Murthy, Fremont, CA (US); Nipun Agarwal, Santa Clara, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 822 days.

(21) Appl. No.: 10/306,130

(22) Filed: Nov. 26, 2002

(65) Prior Publication Data

US 2004/0088415 A1    May 6, 2004

Related U.S. Application Data

(60) Provisional application No. 60/424,543, filed on Nov. 6, 2002.

(51) Int. Cl.
 *G06F 15/16* (2006.01)
(52) U.S. Cl. ...................................................... 709/203
(58) Field of Classification Search ................ 709/203, 709/226
 See application file for complete search history.

(56) References Cited

U.S. PATENT DOCUMENTS

| | | | |
|---|---|---|---|
| 5,463,772 | A | 10/1995 | Thompson et al. |
| 6,128,610 | A | 10/2000 | Srinivasan et al. |
| 6,226,649 | B1 | 5/2001 | Bodamer et al. |
| 6,542,911 | B2 * | 4/2003 | Chakraborty et al. ....... 707/206 |

(Continued)

FOREIGN PATENT DOCUMENTS

EP    1 241589 A2    9/2002

(Continued)

OTHER PUBLICATIONS

Daniele Braga et al., "A Graphical Environment to Query XML Data with Query," Proceedings of the Fourth International Conference on Web Information Systems Engineering (WISE '03), 2003, IEEE, 10 pages.

(Continued)

*Primary Examiner*—Jason Cardone
*Assistant Examiner*—Minh-Chau Nguyen
(74) *Attorney, Agent, or Firm*—Hickman Palermo Truong & Becker LLP

(57) ABSTRACT

Techniques for accessing data that resides in a document on a computer-readable medium by a device with device resources of limited resource amount include determining usage for each portion of the document that consumes the device resources of a plurality of portions of the document. Each portion may be accessed independently of a different portion of the document. Based on the usage, a particular portion of the document is selected to cease consuming the device resources. The device resources consumed by the particular portion are released. The techniques allow a document-processing device with limited resources to scale up to process a large document that would otherwise exceed the available resources. This capability is an advantage when first inserting a large XML document, which cannot be fully manifested in available memory, as multiple loadable units into a database or other persistent store.

36 Claims, 3 Drawing Sheets

U.S. PATENT DOCUMENTS

| | | | |
|---|---|---|---|
| 6,604,100 | B1 | 8/2003 | Fernandez et al. |
| 6,636,845 | B2 | 10/2003 | Chau et al. |
| 6,704,739 | B2 | 3/2004 | Craft et al. |
| 6,704,747 | B1 | 3/2004 | Fong |
| 6,823,428 | B2 * | 11/2004 | Rodriguez et al. ........... 711/136 |
| 6,826,727 | B1 | 11/2004 | Mohr et al. |
| 6,836,857 | B2 | 12/2004 | Ten-Hove et al. |
| 6,851,030 | B2 * | 2/2005 | Tremaine ..................... 711/160 |
| 6,915,307 | B1 * | 7/2005 | Mattis et al. ........... 707/103 R |
| 6,964,025 | B2 | 11/2005 | Angiulo et al. |
| 2002/0029229 | A1 * | 3/2002 | Jakopac et al. ............. 707/500 |
| 2002/0056025 | A1 | 5/2002 | Qiu et al. |
| 2002/0133484 | A1 | 9/2002 | Chau et al. |
| 2002/0143512 | A1 | 10/2002 | Shamoto et al. |
| 2002/0156811 | A1 | 10/2002 | Krupa |
| 2002/0184188 | A1 | 12/2002 | Mandyam et al. |
| 2002/0184401 | A1 | 12/2002 | Kadel, Jr. et al. |
| 2003/0065659 | A1 | 4/2003 | Agarwal et al. |
| 2003/0078906 | A1 | 4/2003 | Ten-Hove et al. |
| 2003/0204787 | A1 * | 10/2003 | Bartucca et al. ............... 714/43 |
| 2004/0064466 | A1 | 4/2004 | Manikutty et al. |

FOREIGN PATENT DOCUMENTS

| | | |
|---|---|---|
| WO | WO 00/49533 | 8/2000 |

OTHER PUBLICATIONS

Cheng, Josephine et al., "IBM DB2 XML Extender," IEEE, ICDE '00 Conference, San Diego, Feb. 2000, 128 pages.

International Preliminary Examination Report, Application No. PCT/US03/35551, pp. 1-17, Oct. 8, 2004.

Written Opinion, Application No. PCT/US03/35551, pp. 1-8, Nov. 10, 2004.

Current claims in PCT/US03/35551, pp. 1-4.

Wolfgang May, "Querying Linked XML Document Networks in the Web", The Eleventh International WWW Conference, May 7, 2002, XP002300873, Honolulu Hawaii, USA, http://www2002.org/CDROM/alternet/index-bytitle.html, 8 pgs.

International Search Report from PCT for International Application No. PCT/US03/35552 dated Nov. 8, 2004 (7 pgs.).

Written Opinion from PCT for International Application No. PCT/US03/35552 dated Nov. 10, 2004 (6 pgs.).

Current Claims in PCT Patent Application No. PCT/US03/35552.

Notification of Transmittal of the International Preliminary Examination Report received in corresponding PCT international application No. PCT/US03/35551, Feb. 16, 2005 (18 pgs).

Lo et al., "XAS: A System for Accessing Componentized, Virtual XML Documents," IEEE, 2001, pp. 493-502.

Zisman et al., "Using XML to Build Consistency Rules for Distributed Specifications," Proceedings of the Tenth International Workshop on Software Specification and Design (IWSD'00), IEEE 2000, 8 pages.

Myllymaki, Jussi, "Effective Wed data Extraction with Standard XML Technologies," WWW10, May 1-5, 2001, pp. 689-696.

Schmidt et al., "Why and How to Benchmark XML Databases," SIGMOND Record, vol. 3, No. 3, Sep. 2001, pp. 27-32.

Chakraborty, Krishnendu, "The XML Garbage Collector", The Source for Developers, Sun Developer Network Site XP-002297849, Mar. 2002.

European Patent Office, "Communication pursuant for Article 96(2) EPC," App. No. 03783237.5 (5027-2784), received Feb. 1, 2007, 5 pages.

Claims dated Jul. 7, 2006, EP App. No. 03783237.5 (5027-2784), 3 pages.

* cited by examiner

TECHNIQUES FOR SCALABLY ACCESSING DATA IN AN ARBITRARILY LARGE DOCUMENT BY A DEVICE WITH LIMITED RESOURCES

CROSS REFERENCE TO RELATED APPLICATIONS

This application claims benefit of Provisional Application 60/424,543, filed Nov. 6, 2002, the entire contents of which are hereby incorporated by reference as if fully set forth herein, under 35 U.S.C. §119(e). This application is related to Application Ser. No. 10/256,777 (hereinafter referenced as "Pannala") filed Sep. 27, 2002 the entire contents of which are hereby incorporated by reference as if fully set forth herein.

FIELD OF THE INVENTION

The present invention relates to techniques for accessing data in an arbitrarily large document that scale with the limited resources available to a device, and in particular, processing data stored in an XML document that is larger than available memory can manifest.

BACKGROUND OF THE INVENTION

The number of businesses exchanging information electronically is proliferating. Businesses that exchange information have recognized the need for a common standard for representing data. Extensible Markup Language ("XML") is rapidly becoming the common standard for representing data.

XML describes and provides structure to a body of data, such as a file or data packet, referred to herein as an XML document. XML standards provide for tags that delimit sections of an XML document referred to as XML elements, or simply "elements".

An element may contain various types of data, including element attributes and other elements. An element that is contained by another element is referred to as a descendant of that element. By defining an element that contains attributes and descendant elements, the XML document defines parent-child hierarchical relationships between the element, its descendant elements, and its attributes.

The term node is used to refer to individual elements and element attributes in an XML document. Thus, an XML document defines a hierarchy of nodes having parent-child relationships. Such a hierarchy is referred to herein as a node tree or a node hierarchy.

The term attribute is used herein to refer to a discrete part or element of a structure, such as a data structure or an object that belongs to an object type according to the object-oriented methodology. An attribute may be a complex construct containing one or more other attributes, referred to herein as a member of the attribute. XML standards provide for element attributes in the form of name-value pairs. While the meaning of the term attribute, as used herein, encompasses element attributes, the term is not so limited.

Industry standards define structures for representing XML documents. One such standard is the Document Object Model (DOM), promulgated by the World Wide Web Consortium (W3C).

In order for a computer to operate on an XML document, an in-memory representation of the XML document is generated. In general, an XML document is loaded from a storage device (e.g., a disk that stores files that contain XML entities) or from data received over a communications channel, to generate in-memory data structures used to represent an XML document. The in-memory data structures are manipulated by computer processes executing software and programs. The process of loading an XML document into memory and generating an in-memory representation of the XML document is referred to as manifestation or manifesting an XML document. Typically, applications access and manipulate the in-memory data structures, created by manifestation, through an API.

Under conventional approaches for manifestation, when an XML document is manifested, the entire XML document is manifested. XML documents can be very large, and thus require a significant amount of memory when manifesting them. Some XML documents are so large that memory needed to manifest them far surpasses the memory allocated to them and may also far surpass the capacity of many computers.

Based on the foregoing, it is desirable to provide a mechanism that reduces the amount of memory needed to manifest an XML document.

In one approach described in Pannala, cited above, an XML document is broken up into a plurality of loadable units that can be separtely stored in database objects of a databae system. Then, when a process attempts to manifest data from the XML document, only the loadable units that contain the data of interest are loaded into memory from the database. The entire XML document is not manifest. A loadable unit is a set of one or more nodes in an XML document. When one node in the loadable unit is manifest, all the nodes in the loadable unit are also manifest. Loadable units may, but not necessarily, correlate to content structures that store the nodes on persistent storage.

While the system of Pannala is useful for many purposes, certain operations fail to take advantage of the separately stored and loaded loadable units. Such operations continue to demand excessive amounts of memory; they do not scale to large XML documents. Such operations include operations that express an interest in many or all of the loadable units of a large XML document, and the operations that initially insert an entire large XML document onto persistent storage, such as into a database system.

Based on the foregoing, it is desirable to provide techniques for reducing the amount of memory needed by operations that involve enough loadable units of an XML document to exceed available memory.

In addition, the approach of Pannela assumes the contents of the loadable units loaded into memory are not changed there, so that a loadable unit can always be replaced by reloading that loadable unit from persistent storage. However, in many operations, one or more of the loadable units have different contents in memory than they have stored separately on persistent storage. For example, during the initial insert into a database system, none of the loadable units first loaded into memory reside as separately stored units in the database on persistent storage. Such loadable units are said to be "dirty." The approach of Pannela is not suitable for dirty loadable units.

Based on the foregoing, it is further desirable to provide techniques for retaining information during operations that involve dirty loadable units of an XML document.

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
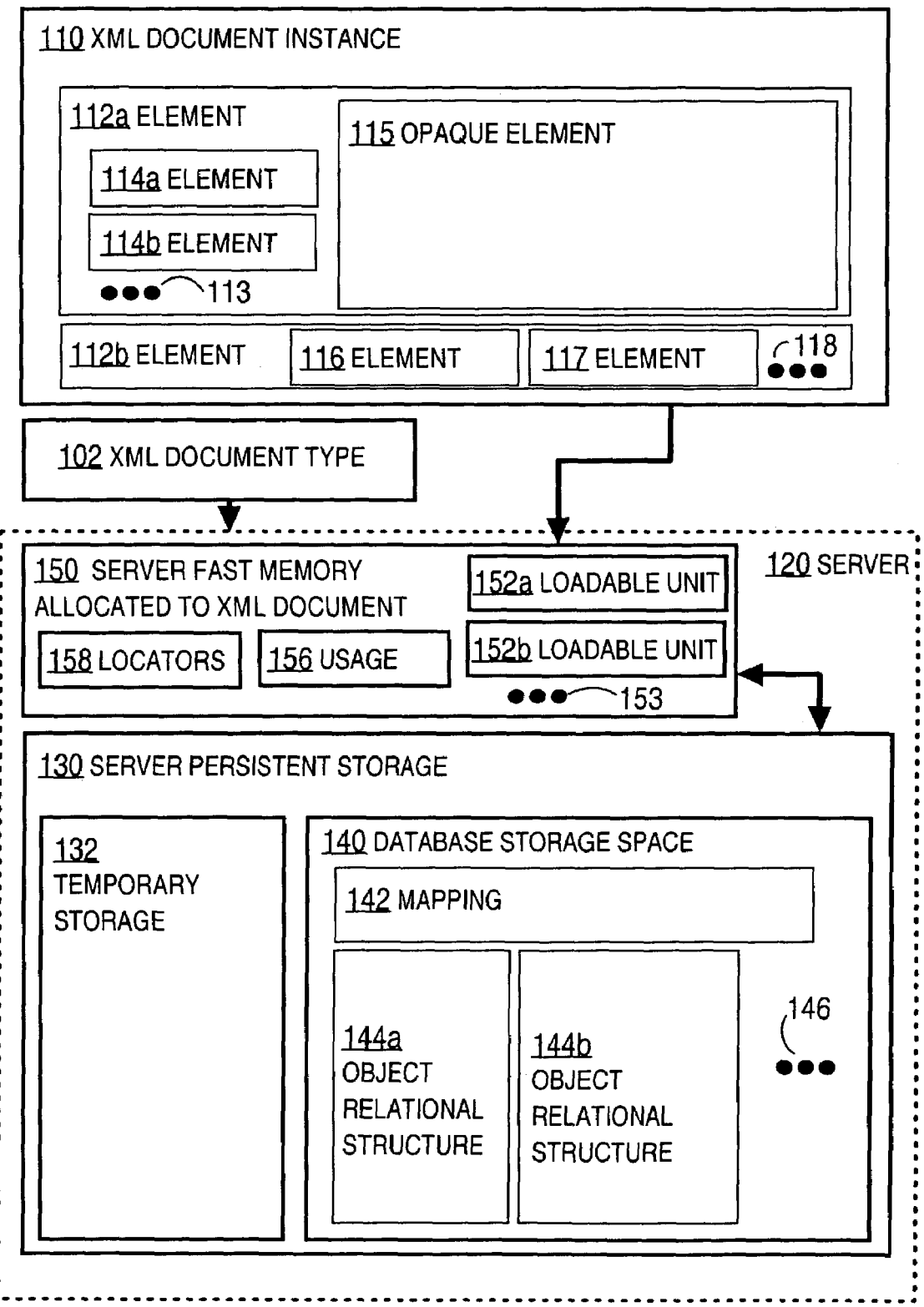
FIG. 1 is a block diagram that illustrates structures used by a server to process an XML document that exceeds available memory, according to an embodiment.

A method and article of manufacture for accessing data in a large document by a device with limited resources is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments of the invention are described herein in the context of using all or part of an XML document, which, if manifested fully in memory, would exceed the amount of memory available on a database server. However, the invention is not limited to this context. Other embodiments of the invention may be applied to other contexts in which the server is not a database server, but provides other services based on the XML document. In still other embodiments, the XML document may be used as input to a stand-alone application that is not a server, i.e. an application that does not respond to requests from a separate client process. In some embodiments, the document accessed is not an XML document but is a document that is composed of multiple constructs according to another markup language. In some embodiments, it is not memory that is limited but some other resource, such as buffers on an input or output device connected to the host computer of the application processing the document, or bandwidth on a network connection over which the document is to be sent.

In the illustrated embodiments, separately accessible portions of the XML document (for example, the "loadable units," LU, of Pannala) are loaded into memory and usage of those portions is monitored. When additional memory is desired, the memory allocated to one or more of those portions is released, based on the usage. For example, the memory allocated to the least recently used portion is released. The portion that loses the memory allocated to it is said to be "unloaded" from memory. In some embodiments, if the portion to be unloaded is dirty (e.g., contains data that is not stored persistently as a separate portion, such as a loadable unit, in one or more containers of a database), then the portion is stored persistently before the memory is reallocated to another portion of the document. Because each loadable unit is independently accessible from the persistent storage, the loadable unit can be retrieved from persistent storage subsequently, if it is to be used again. In some embodiments, the portion is persistently stored directly into an object-relational database structure of a database; in some embodiments the portion is persistently stored in a temporary file on a persistent storage device.

The techniques of the present invention allow a document-processing device with limited resources to scale up to process a large document that would otherwise exceed the available resources. This is an advantage when first inserting a large XML document, which cannot be fully manifested in available memory, as multiple loadable units into a database or other persistent store. This is also an advantage after the different portions of the large XML document have been inserted separately into a persistent data store, if an operation involves more portions than can be manifested in memory at one time, or if the operation modifies the contents of a loadable unit. Examples of such operations are an operation to format the entire document for presentation on a graphical interface using an XML style sheet, and an operation that edits any elements of a large XML document.

Structural Overview

FIG. 1 is a block diagram that illustrates data structures used by a server in an XML processing system 100 to process an XML document that exceeds available memory, according to an embodiment. The system 100 includes a database server 120 that includes server fast memory 150 that is allocated for processing an XML document. As used herein, the term fast memory refers to memory most readily available to a processor for storing data and instructions outside the processor. In current technologies, memory used for this purpose has quick response time; but data does not persist in such memory if power to the memory is lost. Fast memory tends to be more expensive than other types of memory, so, it is often more scarce than other types of memory. The server 120 also includes one or more persistent storage devices that provide server persistent storage 130. In current technologies, such persistent storage retains data if power is lost; but, such storage is slow and is not desirable for use as the most readily available memory for a processor. The persistent storage includes a storage area reserved for temporary storage 132 and a storage area used for database storage space 140.

The database storage space 140 includes storage for one or more object-relational structures, 144a, 144b and others indicated by ellipsis 146, collectively referenced hereinafter as object relational structures 144. The object-relational structures 144 store data objects in one or more relational database data structures, such as tables, rows, columns, and stored procedures.

The system 100 processes an XML document type data structure 102 that defines the attributes of each element type that may be used by an XML document that is an instance of the type. The data structure may reside on any computer readable medium, described in more detail in a later section, which can be read by server 120, such as on a removable magnetic or optical disk, or over a communications channel. The database storage space 140 includes a mapping 142 between element attributes, or elements, used in the XML documents and the data objects in one or more object-relational structures 144. The system 100 generates the contents of the mapping 142 based on the contents of the XML document type data structure 102 using any mechanism known in the art. In some embodiments, the object-relational structures are actually defined and created based on the contents of the XML document type data structure 102. In one embodiment, the mechanism described in Pannala is employed to map elements and attributes of the XML document type data structure to data objects of the object-relational data structures 144.

An XML document 110 is an instance of the type defined in data structure 102. The XML document 110 includes one or more elements that each may comprise one or more attributes, which each may be another element, as defined in the document type data structure 102. The XML document 110 thus establishes a particular hierarchy of nodes, where each child node represents an attribute of its parent node, and each attribute has a value appropriate for its type.

For purposes of illustration, it is assumed that XML document 110 has several attributes, including one attribute represented by element 112a and another attribute represented by element 112b. It is further assumed that element 112a has several attributes, including attributes represented by elements 114a, 114b, 115, and other elements represented by the ellipsis 113. It is further assumed that elements 114a, 114b may include other attributes that include other elements, not shown. It is also assumed that element 115 is a block of data that is not further divided or defined by the XML type data structure 102; it is called an "opaque" element, and can be quite large. For example, opaque element 115 might include text for a long description of terms and conditions of a purchase order contract, or might include a string of characters that represents a genetic code sequence. It is further assumed that element 112b has several attributes, including attributes represented by elements 116, 117, and other elements represented by the ellipsis 118.

The server establishes one or more loadable unit (LU) data structures, such as 152a, 152b, and others represented by ellipsis 153, collectively referenced hereinafter as LU data structures 152. During processing, data for one or more nodes of XML document 110 are converted to a LU in memory 150 for storage on permanent storage 130. For some LU, the values of the attributes are included in the LU. For some LU, the value for an attribute, such as a child element, is not included in the LU. Instead, the other attribute is itself a different LU. A locator indicates a location for the different LU in permanent storage 130. The locator for the different LU is included in the parent LU. Thus the LU contains enough information to load the rest of the XML tree, at nodes beyond the nodes in the parent LU. An LU indicated by a locator in a parent LU is sometimes called an "out-of-line" LU because it is often stored in a one or more different data structures from the data structure that stores the parent LU.

The server 120 also establishes a usage data structure 156 for recording usage of the data in the LU data structures 152. For example, the usage data structure 156 includes a first data item that indicates whether a process on server 120 is finished with the data in a particular LU data structure 152 in memory 150. In some embodiments, the usage data structure includes a second data item that indicates a relative time when the data in the particular LU data structure 152 was last used.

The server 120 also establishes a locators data structure 158. The locators data structure 158 holds a locator that indicates where on persistent storage 130 a particular LU is stored and associates that locator with a LU identifier, such as a LU name. For example, a locator indicates a file name and offset for data written to a large object (LOB) in temporary storage 132. In another example, a locator indicates a data item, such as a row, in one or more object-relational structures 144 in database storage space 140. Object-relational structures 144 may include a database LOB structure, among others.

Functional Overview

Figure 2:
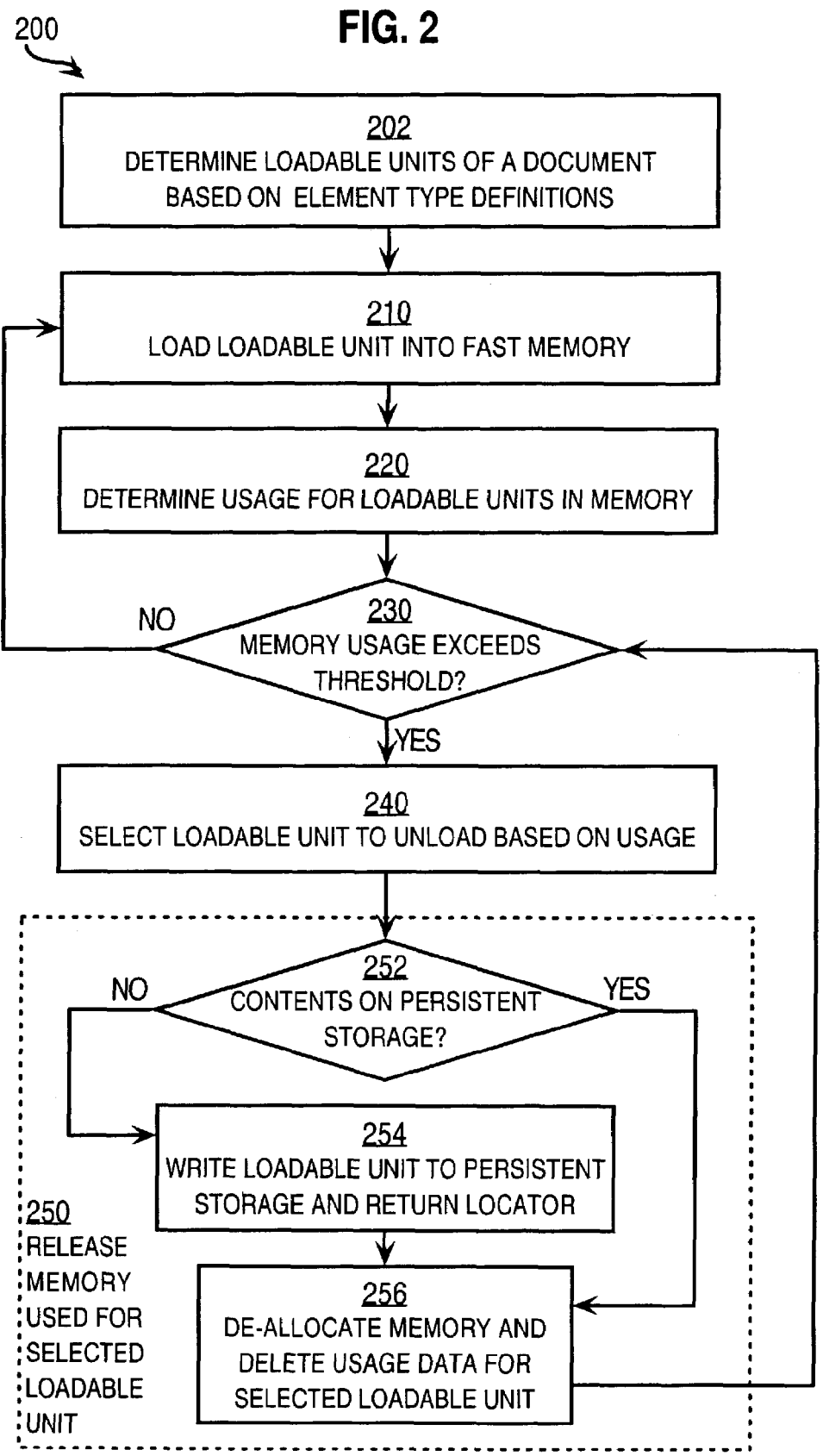
FIG. 2 is a flow diagram that illustrates a high level method for processing an XML document that exceeds available memory, according to an embodiment.

FIG. 2 is a flow diagram that illustrates a high level method 200 for processing an XML document that exceeds available memory, according to an embodiment. Though steps are depicted in FIG. 2 in a particular order, in other embodiments the steps may be performed in a different order, or overlapping in time.

In step 202, the loadable units for a document are determined based on the element type definitions in the XML document type data structure 102. Standards for XML define a schema language for specifying the structure of an XML document, which language may be used in the data structure 102. The structure defined in the XML document type data structure 102 is referred to herein as an XML schema. The database server 120 has the ability to interpret an XML document type data structure 102 and create or modify object-relational structures 144 needed to support the XML schema. For example, the XML schema construct "<complexType>" is mapped to an object type in the database. Additional user annotations in the XML schema are used to specify particular storage parameters, thus allowing some portions of the XML document to be stored in additional tables, large objects (LOBs) and other database containers. In other embodiments, a different server has the ability to interpret an XML document type data structure 102 and create or modify other data containers needed to support the XML schema.

In step 210, a loadable unit (LU) is loaded into fast memory 150 allocated to processing the XML document and stored in a LU data structure 152. The LU may be retrieved from the database in database storage space 140, or from temporary storage 132, or from an XML document 110 on some other computer-readable medium. When an LU that uses a locator for one or more attributes is loaded from temporary storage 132 or XML document 110, a value for the locator might not yet be established for the attribute's location in the database; in such cases a temporary value for the locator is used, such as a name of the first element that corresponds to the LU.

For example, it is assumed for purposes of illustration that element 112a corresponds to one loadable unit, and elements 114a, 114b, and 115 are each different loadable units. Thus the LU for element 112a uses locators instead of actual values for attributes that correspond to elements 114a, 114b and 115. When element 112a is read from new XML document 110 by server 120, a LU data structure 152 (e.g., 152b) is generated in memory 150 to hold this element, but elements 114a, 114b, 115 have not yet been read in or stored on persistent storage 130, so no locators are yet defined for the LU data structures that will hold these LUs. When these elements are read, LU data structures are created.

In step 220, usage is determined for the LUs stored in memory data structures 152 and the usage is stored in usage data structure 156. In an embodiment, the usage data structure 156 includes a LU memory address field (designated hereinafter "MEM_ADDR"), a count field (designated hereinafter "COUNT") and a time field (designated hereinafter "TIME") for each LU data structure in memory 150. In some embodiments, the usage data structure 156 is separate from the LU data structures 152, and a separate record is included in the usage data structure 156 for each LU data structure 152. When a LU data structure 152 is created in memory 150, a row is added to the usage data structure 158 with values in these fields. The value for the MEM_ADDR field indicates where in the memory 150 the LU data structure 152 begins. The value for the COUNT field is set to "1," to indicate that one process is using the LU data structure (in this case the process that is creating the data structure). The value for the TIME field is set to the current system time to indicate when the LU data structure was last used.

In other embodiments, more or fewer fields are used in usage data structure 156. For example, in some embodiments, a size field (designated hereinafter "SIZE") is included for each LU data structure 152 to indicate the size of the LU data structure 152. In some embodiments a dirty flag field (designated hereinafter "DIRTY" field) is included for each LU data structure 152 to indicate whether contents of the LU are dirty, i.e., possibly different from the contents of that LU on persistent storage 130. The DIRTY field holds one of two values; one value indicates that the corresponding LU is dirty, and the other indicates that the corresponding LU is not dirty.

In some embodiments usage data structure 156 is part of the LU data structure 152. In such embodiments, the MEM_ADDR field may be omitted and, when a LU data structure 152 is created in memory 150, values are stored in the other fields of usage data structure 156, as described above.

Whenever a process of server 120 that uses a LU data structure 152 begins, the value in the COUNT field corresponding to that LU is incremented by one, and the value of the TIME field corresponding to that LU is updated. The beginning of a process that uses a LU data structure is called, hereinafter, a "touch" of that LU data structure. Whenever a process of server 120 that uses a LU data structure 152 ends, the value in the COUNT field corresponding to that LU is decremented by one, and the value of the TIME field corresponding to that LU is updated. For example, a process that simply loads data from the XML document 110 causes the value of the corresponding COUNT to be 1 when the LU data structure 152 is created, and decrements the value of COUNT to zero when the LU is fully loaded into the data structure 152. As soon as the LUs corresponding to the attributes are loaded, the parent LU is considered fully loaded.

In an illustrated embodiment, the usage data structure 156 includes a list of unloadable units. When the value of the COUNT field reaches zero, the corresponding LU data structure is added to the list. Any method may be used to indicate the LU on the list. In one example, an LU in the list is indicated by its memory address. In other embodiments, values of the COUNT field other than zero may be used to qualify the LU data structure for inclusion on the list of unloadable units. Embodiments that use this list need not maintain the TIME field in the usage data structure 156, because the LU data structures are added to the list of unloadable units in order of time from the earliest to the latest that became unloadable.

In step 230, it is determined whether a condition for releasing memory allocated to one or more LU data structures 152 is satisfied. In the illustrated embodiment, the condition for releasing memory is that total use of memory 150 by the LU data structures 152 exceeds a threshold value. The threshold value is typically chosen to be less than the total memory allocated. For example, the condition for releasing memory may be that more than 75% of the memory 150 is consumed by the LU data structures 152. The total memory consumed may be computed by adding all the values of the SIZE fields in the usage data structure 156. If it is determined in step 230 that the condition for releasing memory is not satisfied, then control passes back to step 210 to load the next LU into fast memory. If it is determined in step 230 that the condition for releasing memory is satisfied, then control passes to step 240.

In step 240, one or more of the LU data structures are selected to be unloaded, based on usage. For example, the least recently used LU data structure is selected to be unloaded. The least recently used LU data structure can be determined by finding the LU data structure 152 corresponding to the earliest value in the TIME field.

In order to avoid unloading a LU that is still in use by a process, in some embodiments, only LU data structures with COUNT values of zero are considered for unloading. In some such embodiments, the least recently used LU is determined only from the list of unloadable units, described above. The least recently used LU data structure is the first LU data structure indicated in the list of unloadable units.

In step 250, the memory allocated to the selected LU data structure is released. In some embodiments, step 250 includes steps 252, 254, 256.

In step 252, it is determined whether the contents of the selected LU data structure 152 are stored separately in persistent storage. In embodiments with a DIRTY field associated with each LU data structure 152, step 252 may be performed by determining whether the DIRTY filed indicates the LU data structure 152 is not dirty. If it is determined that the selected LU data structure 152 is not dirty, then control passes to step 256, described below, without writing the contents to persistent storage.

If it is determined in step 252 that the selected LU data structure is dirty, control passes to step 254. In step 254, the LU contents in the LU data structure 152 are written to a LU data structure on persistent storage 130. In some embodiments, the LU is written to a data structure on temporary storage 132. In some embodiments, the LU is written to an object-relational structure 144 on database storage space 140. In either or other embodiments, a locator is returned that indicates a location for the LU on persistent storage 130, so that the LU can be reloaded into memory 150 at a later time. In the illustrated embodiment, the locator returned is stored in the locators data structure 158, where the locator is associated with the LU identifier, such as the LU name or name of the first corresponding XML element.

In step 256, the memory allocated to the selected LU data structure 152 in fast memory 152 is de-allocated and made available for allocation to a different LU data structure. In some embodiments, this step includes deleting usage information corresponding to the selected LU data structure from the usage data structure 156. Control then passes back to step 230 to determine whether the condition for releasing memory is still satisfied.

These techniques allow a device with limited resources, such as a limited amount of fast memory, to scale up to process documents of arbitrarily large size. This capability is an advantage when first inserting a large XML document, which cannot be fully manifested in available memory, as multiple loadable units into a database or other persistent store. This capability is also an advantage after the different portions of the large XML document have been inserted separately into a persistent data store, if an operation involves more portions than can be manifested in memory at one time, such as while processing an entire XML document to apply styles specified in an XML style sheet (XSL) document. The uses of the illustrated embodiment for these two cases are described in the next two sections.

Inserting an XML Document into a Database

For purposes of illustrating this case, it is assumed that the object relational structures 144 in the database have already been created or modified based on an XML schema presented in the XML document type data structure 102, during step 202. It is further assumed that XML document 110 is received from some external source, such as over a communications channel or from a removable, optical disk, and is to be inserted into the database. It is further assumed that server fast memory 150 has been allocated to process the document 110. It is further assumed that the COUNT field, the SIZE field, and a DIRTY field of the usage data structure 156 are included in each LU data structure, and that the usage data structure 156 includes, outside the LU data structures 152, a list of unloadable units that indicates the LU data structures where the COUNT value is zero. A LU data structure is identified in the list by the memory address of the first byte in the LU data structure 152. It is further assumed that the amount of fast memory 150 allocated to this document is 2 million bytes (2 MB) and the threshold for unloading a loadable unit is 1.5 MB.

During step 210, the server 120 creates a first LU data structure 152a, called hereinafter "LU-A" to store the highest node in the XML hierarchy, the document level node for document 110. The COUNT field is initialized with the value 1. The DIRTY field is initiated with the value 1, which is assumed, for purposes of illustration, to indicate a dirty LU data structure. The LU data structure LU-A 152a is dirty because the contents have not yet been stored persistently as a LU. The SIZE field is initiated with a minimum size for document level LU, which comprises enough room for the values of attributes and locators for the elements 112a, 112b etc. up to the minimum number of elements expected for document 110 based on its schema. It is assumed for purposes of illustration that the SIZE of LU-A is 0.01 MB. The server 120 processes the first few lines of the XML document 110 and loads the values of the attributes of the document into LU-A, 152a. The server then comes to a line of the XML document that begins the element 112a, before locators for the out-of-line LUs associated with elements 112a, 112b are determined. Thus the loading process is not finished with LU-A and the COUNT remains set with a value of 1.

During step 220 it is determined that the total memory used by the LU data structures 152 is the SIZE of LU-A. The list of unloadable units in usage data structure 156 is empty. In step 230 it is determined that this amount of memory (0.01 MB) does not exceed the threshold of 1.5 MB and control passes back to step 210 to begin loading the next LU.

During this iteration of step 210, the server 120 creates a second loadable unit data structure 152b, called hereinafter "LU-B" to store the node associated with element 112a. The COUNT field and the DIRTY field are each initialized with the value 1. The SIZE field is initiated with a minimum size for the LU for element 112, which comprises enough room for the values of attributes and locators for the elements 114a, 114b, 115, etc. up to the minimum number of elements expected for element 112a, based on its schema. It is assumed for purposes of illustration that the SIZE of LU-B is 0.1 MB. The server 120 processes the first few lines of the element 112a and loads the values of the attributes of the element into LU-B, 152b. The server then comes to a line of the XML document that begins the element 114a, before locators for the out-of-line LUs associated with elements 114a, 114b, 115 are determined. Thus the loading process is not finished with LU-B and the COUNT remains set with a value of 1.

During the next iteration of step 220 it is determined that the total memory used by the LU data structures 152 is the SIZE of LU-A and LU-B. The list of unloadable units in usage data structure 156 is empty. In the next iteration of step 230, it is determined that this amount of memory (0.11 MB) does not exceed the threshold of 1.5 MB and control passes back to step 210 to begin loading the next LU.

The process continues with the next LUs associated with the child elements of 112a, including elements 114a, 114b, 115. It is assumed for purposes of illustration that elements 114a, 114b and 115 do not include child elements, and that the values for the SIZE fields of the three elements are 0.2 MB, 0.2 MB, and 1.1 MB, respectively. It is further assumed that based on the existence of elements 114b and 115, additional locators have been added to LU-B and the value of the SIZE field in LU-B is thereby increased to 0.11. As soon as each is loaded completely into LU data structures LU-C, LU-D, LU-E, respectively, (not shown) in memory 150, the values of the COUNT field is decremented to zero, and the addresses of the three LU data structures are added to the list of unloadable units in usage data structure 156.

During the next iteration of step 220 it is determined that the total memory used by the LU data structures 152 is the sum of the values in the SIZE fields of LU-A, LU-B, LU-C, LU-D and LU-E. The list of unloadable units in usage data structure 156i includes the memory addresses of LU-C, LU-D, and LU-E. In the next iteration of step 230, it is determined that this amount of memory (1.62 MB) does exceed the threshold of 1.5 MB and control passes to step 240 to select a LU data structure 152 to unload from memory 150.

In step 240, the least recently used LU data structure in the list of unloadable units is selected. The first LU data structure in the list, which is LU-C corresponding to element 114a, is the least recently used. Therefore LU-C is selected as the LU data structure to unload. In other embodiments, other selection criteria may be used. For example, the LU data structure LU-E with the largest value (1.1 MB) of SIZE may be selected. The proper selection is determined based on the manner in which a system is used. It is expected that the most recently used LU is the most likely to be used again, and that the least recent is least likely to be used again. Therefore the least likely is selected to avoid unloading a LU that is more likely to be loaded again.

In step 252, it is determined whether LU-C is dirty. Because the value of the DIRTY field indicates LU-C is dirty, control passes to step 254. In step 254, LU-C is written to an object-relational structure 144 of the database and a locator for LU-C, designated herein as "L-C" is returned in the process. The server 120 writes the value "L-C" to the locators data structure 158 in association with an identifier to the LU formed for element 114a. All LU data structures 152 in memory, which have unresolved references to element 114a as an attribute, have those references resolved by using this locator "L-C." Any LU data structure that receives its last unresolved locator has its COUNT field decremented. If the LU data structure is associated with a COUNT value that reaches zero, then the LU data structure is added to the list of unloadable units. In step 256, the memory allocated to LU-C is freed, so it can be allocated to another LU data structure. Also in step 256, the usage information for LU-C in usage data structure 156 is deleted.

Control then passes back to step 230 to determine if the memory usage still exceeds the threshold. The total memory used by the LU data structures 152 is the sum of the values in the SIZE fields of LU-A, LU-B, LU-D and LU-E (without LU-C). The list of unloadable units in usage data structure 156 includes the memory addresses of LU-D, LU-E (without LU-C). It is determined that this amount of memory (1.42 MB) does not exceed the threshold of 1.5 MB and control passes back to step 210 to load the next loadable unit into memory 150.

Thus an XML document of arbitrary size may be inserted into a database using a server with a limited amount of fast memory allocated to the document.

In some embodiments, the XML document is a transient document that is only used for a short time, but is not to be permanently stored in the database. In such embodiments, the steps are similar, except during writing to persistent storage, step 254, the LU are written to data structures in temporary storage. In one embodiment in this group, the temporary storage data structure is a LOB file with a number of offset bytes where the LU begins and the mapping 142 is still stored within the database.

Processing an XML Document from a Database

For purposes of illustrating this case, the assumptions used in the previous case are made again, except that, instead of obtaining the XML document 110 from an external source, it already resides in the database. Thus every LU that uses an out-of-line child LU has a defined locator for that child LU. It is further assumed that the entire XML document is to be operated on to form a presentation that is styled according to an XSL document, with the styled result sent to a display device.

During step 210, the server 120 creates the first loadable unit data structure 152a, called "LU-A" to store the highest node in the XML hierarchy, the document level node for document 110. The COUNT field is initialized with the value 1. The DIRTY field is initiated with the value 0, to indicate a LU data structure that is not dirty. The LU data structure is not dirty because the contents have been retrieved from persistent storage in the database and have not been changed. The SIZE field is initiated with actual size for document level LU. The server 120 processes the first few attributes of the XML document 110 according to the XSL document and sends the result to the destination, the display device. The server then must start styling element 112a, before the whole document is styled. Thus the styling process is not finished with LU-A and the COUNT remains set with a value of 1.

As above, during step 220 it is determined that the total memory used by the LU data structures 152 is the SIZE of LU-A. The list of unloadable units in usage data structure 156 is empty. In step 230 it is determined that this amount of memory (0.01 MB) does not exceed the threshold of 1.5 MB and control passes back to step 210 to begin loading the next LU.

During this iteration of step 210, the server 120 creates a second loadable unit data structure 152b, called "LU-B" to store the node associated with element 112a. The COUNT field and the DIRTY field are initialized with the values 1, 0, respectively. The SIZE field is initiated with the actual size for the LU for element 112. It is assumed for purposes of illustration that the SIZE of LU-B is 0.11 MB. The server 120 styles the first few attributes of element 112a and sends the results to the destination display device. The server comes to style an attribute that corresponds to element 114a, before finishing the styling of element 112a. Thus the styling process is not finished with LU-B and the COUNT remains set with a value of 1.

During the next iteration of step 220 it is determined that the total memory used by the LU data structures 152 is the SIZE of LU-A and LU-B. The list of unloadable units in usage data structure 156 is empty. In the next iteration of step 230, it is determined that this amount of memory (0.12 MB) does not exceed the threshold of 1.5 MB and control passes back to step 210 to begin loading the next LU.

The process continues with the next LUs associated with the child elements of 112a, including elements 114a, 114b, 115. As above, it is assumed for purposes of illustration that elements 114a, 114b and 115 do not include child elements, and that the values for the SIZE fields of the three elements are 0.2 MB, 0.2 MB, and 1.1 MB, respectively. As soon as each is loaded completely into LU data structures LU-C, LU-D, LU-E, respectively, (not shown) in memory 150, COUNT is incremented to 1; when the styling begins the COUNT is incremented again to 2. When the styling is finished, the COUNT is decremented to 1, and when the result is sent to the destination display device, the COUNT field is decremented again to zero. When the COUNT is decremented to zero for each of the three LU data structures, the address of each is added to the list of unloadable units in usage data structure 156.

During the next iteration of step 220 it is determined that the total memory used by the LU data structures 152 is the sum of the values in the SIZE fields of LU-A, LU-B, LU-C, LU-D and LU-E. The list of unloadable units in usage data structure 156 includes the memory addresses of LU-C, LU-D, LU-E. In the next iteration of step 230, it is determined that this amount of memory (1.62 MB) does exceed the threshold of 1.5 MB and control passes back to step 240 to select a LU data structure 152 to unload from memory 150.

In step 240, the least recently used LU data structure in the list of unloadable units is selected. The first LU data structure in the list, which is LU-C corresponding to element 114a, is the least recently used. Therefore LU-C is selected as the LU data structure to unload.

In step 252, it is determined whether LU-C is dirty. Because the value of the DIRTY field indicates LU-C is not dirty, control passes to step 256. In step 256, the memory allocated to LU-C is freed to be allocated to another LU data structure and the usage information for LU-C in usage data structure 156 is deleted.

Control then passes back to step 230 to determine if the memory usage still exceeds the threshold. It is determined that the total memory used by the LU data structures 152 is the sum of the values in the SIZE fields of LU-A, LU-B, LU-D and LU-E (without LU-C). The list of unloadable units in usage data structure 156 includes the memory addresses of LU-D, LU-E (without LU-C). In the next iteration of step 230, it is determined that this amount of memory (1.42 MB) does not exceed the threshold of 1.5 MB and control passes back to step 210 to load the next loadable unit into memory 150.

Thus an XML document of arbitrary size may be processed from a database using a server with a limited amount of fast memory allocated to the document.

Hardware Overview

Figure 3:
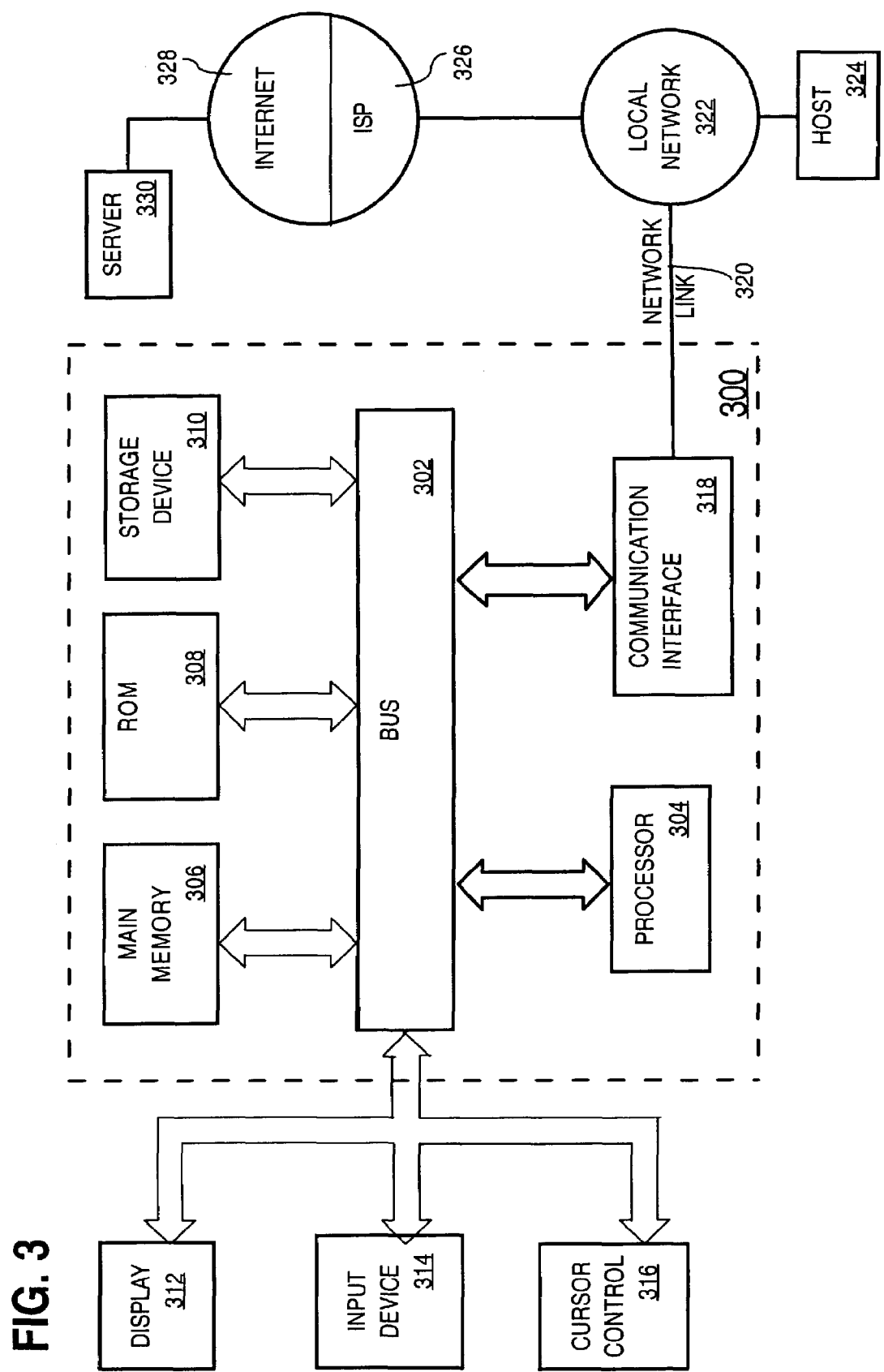
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for accessing data which resides in a document with content structured according to a markup language, on a computer-readable medium using a device with device resources of limited resource amount, the method comprising the steps of:

for each portion of the document, of a plurality of portions of the document,
maintaining a count that indicates how many processes are currently using the portion;
wherein maintaining a count for each portion includes, for each portion, performing the steps of
incrementing the count for the portion in response to any process beginning to use the portion, and
decrementing the count for the portion in response to any process ceasing to use the portion;
wherein each portion is based on one or more constructs of the markup language;
based on the counts, selecting a particular portion of the document to cease consuming the device resources; and
releasing the device resources consumed by the particular portion.

2. The method of claim 1, said step of releasing the device resources consumed by the particular portion comprising the steps of:
determining whether contents of the particular portion reside in persistent storage separately from a different portion of the document; and
if it is determined that the contents do not reside in persistent storage separately from a different portion, then writing the contents to persistent storage separately from a different portion before releasing the device resources consumed by the particular portion.

3. The method of claim 2, said step of releasing the device resources consumed by the particular portion further comprising, if it is determined that the contents do reside in persistent storage separately from a different portion, then performing the step of releasing the device resources consumed by the particular portion without writing the contents to persistent storage.

4. A computer-readable storage medium storing one or more sequences of instructions which, when executed by one or more processors, causes the one or more processors to perform the method recited in claim 3.

5. The method of claim 2, wherein the persistent storage is a file in a file system.

6. A computer-readable storage medium storing one or more sequences of instructions which, when executed by one or more processors, causes the one or more processors to perform the method recited in claim 5.

7. The method of claim 2, wherein the persistent storage is a database object in a database system.

8. A computer-readable storage medium storing one or more sequences of instructions which, when executed by one or more processors, causes the one or more processors to perform the method recited in claim 7.

9. The method of claim 2, said step of releasing the device resources further comprising the step of returning a reference to the particular portion in the persistent storage.

10. A computer-readable storage medium storing one or more sequences of instructions which, when executed by one or more processors, causes the one or more processors to perform the method recited in claim 9.

11. A computer-readable storage medium storing one or more sequences of instructions which, when executed by one or more processors, causes the one or more processors to perform the method recited in claim 2.

12. The method of claim 1, wherein:
said step of maintaining a count comprises incrementing the count when a process using the portion begins and decrementing the count when a process using the portion ends; and
said step of selecting the particular portion comprises determining that the count for the particular portion is less than a minimum number.

13. The method of claim 12, wherein the minimum number is one.

14. A computer-readable storage medium storing one or more sequences of instructions which, when executed by one or more processors, causes the one or more processors to perform the method recited in claim 13.

15. The method of claim 12, wherein said step of selecting the particular portion comprises selecting the particular portion that is least recently used from a plurality of portions for which the count is less than the minimum number.

16. A computer-readable storage medium storing one or more sequences of instructions which, when executed by one or more processors, causes the one or more processors to perform the method recited in claim 15.

17. A computer-readable storage medium storing one or more sequences of instructions which, when executed by one or more processors, causes the one or more processors to perform the method recited in claim 12.

18. The method of claim 1, further comprising the steps of:
determining hierarchical elements of the document from a type definition document associated with the document; and
determining the plurality of portions of the document based on the hierarchical elements.

19. The method of claim 18, wherein the document is an XML document and the type definition document is a document type definition (DTD) document.

20. A computer-readable storage medium storing one or more sequences of instructions which, when executed by one or more processors, causes the one or more processors to perform the method recited in claim 19.

21. The method of claim 18, wherein the document is an XML document and the type definition document is a XML schema document.

22. A computer-readable storage medium storing one or more sequences of instructions which, when executed by one or more processors, causes the one or more processors to perform the method recited in claim 21.

23. A computer-readable storage medium storing one or more sequences of instructions which, when executed by one or more processors, causes the one or more processors to perform the method recited in claim 18.

24. The method of claim 1, wherein:
the method further comprises the step of determining whether a condition for releasing a resource is satisfied; and
said step of selecting the particular portion is performed only if it is determined that the condition for releasing a resource is satisfied.

25. The method of claim 24, further comprising:
determining total resource usage by all portions of the document that consume the device resources; and
wherein the condition for releasing a resource includes that the total resource usage exceed a threshold resource amount that is less than the limited resource amount.

26. A computer-readable storage medium storing one or more sequences of instructions which, when executed by one or more processors, causes the one or more processors to perform the method recited in claim 24.

27. A computer-readable storage medium storing one or more sequences of instructions which, when executed by one or more processors, causes the one or more processors to perform the method recited in claim 25.

28. The method of claim 1, said step of selecting the particular portion comprising selecting the particular portion that is least recently used of a plurality of portions consuming the device resources.

29. A computer-readable storage medium storing one or more sequences of instructions which, when executed by one or more processors, causes the one or more processors to perform the method recited in claim 28.

30. The method of claim 1, wherein the document is an extensible markup language (XML) document.

31. A computer-readable storage medium storing one or more sequences of instructions which, when executed by one or more processors, causes the one or more processors to perform the method recited in claim 30.

32. A computer-readable storage medium storing one or more sequences of instructions which, when executed by one or more processors, causes the one or more processors to perform the method recited in claim 1.

33. A method for performing an operation on a document with content structured according to a markup language, the method comprising the steps of:
  determining that said operation involves a plurality of portions of said document,
    including a first set of one or more portions and a second set of one or more portions;
  during performance of said operation, performing the steps of
    loading the first set of one or more portions of the document into volatile memory;
    maintaining a count for the first set of one or more portions, wherein maintaining the count includes incrementing the count in response to any process that is not currently using any portion that belongs to the first set of portions beginning to use a portion that belongs to the first set of portions, and
      decrementing the count in response to any process ceasing to use any portion that belongs to the first set of portions;
  prior to completion of said operation, selecting at least one portion in said first set of portions to cease consuming volatile memory based on how many processes are currently using said first set of portions, as indicated by the count; and
  prior to completion of said operation and after selecting said at least one portion, freeing up the volatile memory that held said at least one portion in order to load into volatile memory said second set of one or more portions of the document.

34. The method of claim 33 wherein:
the document is an extensible markup language (XML) document that has a size that exceeds the volatile memory of a computer device;
the operation involves loading the document into the volatile memory of the computer device by receiving into volatile memory of the computer device a stream of data representing the XML document;
the step of selecting at least one portion includes determining a particular portion of a plurality of portions of the document based on one or more XML constructs;
the method further comprises the steps of:
  before all of the XML document has been received into the volatile memory, storing the particular portion separately on persistent storage; and
  in the volatile memory, associating a locator for the particular portion with an XML construct that corresponds to a parent node for at least one XML construct upon which the particular portion is based.

35. A computer-readable storage medium storing one or more sequences of instructions which, when executed by one or more processors, causes the one or more processors to perform the method recited in claim 34.

36. A computer-readable storage medium storing one or more sequences of instructions which, when executed by one or more processors, causes the one or more processors to perform the method recited in claim 33.

* * * * *

UNITED STATES PATENT AND TRADEMARK OFFICE
CERTIFICATE OF CORRECTION

PATENT NO. : 7,308,474 B2  
APPLICATION NO. : 10/306130  
DATED : December 11, 2007  
INVENTOR(S) : Chandrasekar et al.

Page 1 of 1

It is certified that error appears in the above-identified patent and that said Letters Patent is hereby corrected as shown below:

In column 2, line 25, delete "separtely" and insert -- separately --, therefor.

In column 2, line 26, delete "databae" and insert -- database --, therefor.

In column 2, line 48, delete "Pannela" and insert -- Pannala --, therefor.

In column 2, line 58, delete "Pannela" and insert -- Pannala --, therefor.

In column 4, lines 56-57, delete "computer readable" and insert -- computer-readable --, therefor.

In column 13, line 65, delete "computer readable" and insert -- computer-readable --, therefor.

Signed and Sealed this

Ninth Day of September, 2008

JON W. DUDAS  
*Director of the United States Patent and Trademark Office*